United States Patent Office 2,768,163
Patented Oct. 23, 1956

2,768,163

PROCESS FOR PREPARING 9,11-OXIDO-STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951, Serial No. 261,590

Claims priority, application Switzerland December 22, 1950

3 Claims. (Cl. 260—239.55)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17α,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained when a $\Delta^{7,8:9,11}$-steroid is treated with an agent capable of introducing oxygen, the resultant 9,11-oxido-7-oxo compound is isomerized and the oxo-group in 7-position of the resultant 7,11-dioxo-steroid is removed by reduction.

The process is illustrated by the following diagram of partial formulae

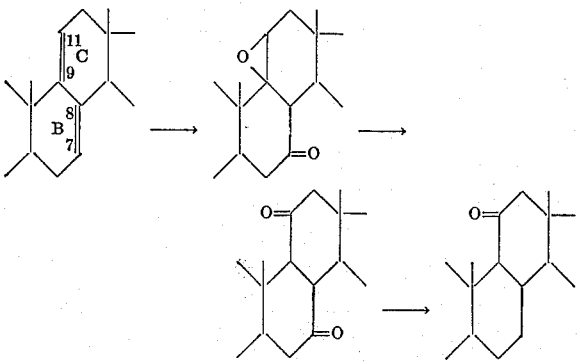

An object of the present invention are 9,11-oxido-7-oxo-steroids. These compounds are new and are intended for use as intermediate products for the preparation of 11-oxo-steroids and 11-hydroxy-steroids. Thus, the present invention is a step in the preparation of the methyl-3α-acetoxy-11-oxo-cholanate (see e. g. Example 5 of co-pending application S. N. 261,581, filed on even date herewith) which is a recognized and well known intermediate for the production of the highly active hormone 11-dehydro-corticosterone (cf. Wettstein & Meystre: Helv. Chim. Acta, vol. 30, pp. 1262–1265 (1947)). Another object of the invention is a process for the manufacture of 9,11-oxido-7-oxo-steroids. It comprises treating a $\Delta^{7,8:9,11}$-steroid with hydrogen peroxide.

These $\Delta^{7,8:9,11}$-steroids belong to the cyclopentanopolyhydropenanthrene or the polyhydrochrysene series. Particular importance is attached to the derivatives or cholestane, coprostane, sitostane, stigmastane, cholane, allocholane, pregnane, androstane and etiocholane. In addition to the aforementioned double bonds, the starting materials may have other double bonds. Where any double bonds are reactive these are suitably protected before the oxidation step of the process, for example by attachment of halogen or hydrogen halide. For the protection of the 5,6-double bond, $\Delta^{5,6}$-steroids may be converted into i-steroids. They can be obtained, e. g. by dehydrogenating corresponding $\Delta^{7,8}$-steroid with mercuric acetate, selenium dioxide or bromine.

For the oxidation according to the invention, hydrogen peroxide is used in the presence of a diluent, such as an organic solvent, e. g. acetic acid.

The following examples illustrate the invention, the relation between parts by weight and parts by volume being the same as that between the gram and the cubic centimeter:

Example 1

3.5 parts by weight of $\Delta^{7,8:9,11:22,23}$-3β-acetoxy-ergostatriene are suspended in 500 parts by volume of glacial acetic acid. To this suspension 66 parts by volume of an aqueous solution of hydrogen peroxide, containing 0.012 part by weight of active oxygen per part by volume, are added. The reaction mixture is mechanically shaken for 5 days whereby the undissolved material goes into solution. At the end of the reaction period, the mixture is diluted with 1000 parts by volume of water and extracted with ether. The ethereal solution is washed with water, sodium bicarbonate solution and again with water, dried and evaporated. The crude product thus obtained is recrystallized from methanol, whereby $\Delta^{22,23}$-3β-acetoxy-7-oxo-9,11-oxido-erogstene of melting point 205° C. separates in nice crystals.

By treating $\Delta^{7,8:9,11:22,23}$-3β-acetoxy-stigmastatariene with hydrogen peroxide under identical conditions $\Delta^{22,23}$-3β-acetoxy-7-oxo-9,11-oxido-stigmastene is obtained.

Example 2

1 part by weight of $\Delta^{7,8:9,11}$-3β,20-diacetoxy-allo-pregnadiene, dissolved in 100 parts by volume of glacial acetic acid, is mixed with 29 parts by volume of an aqueous solution of hydrogen peroxide, containing 0.012 part by weight of active oxygen per part by volume. The solution is then kept at room temperature for 6 days, diluted with 200 parts by volume of water and extracted with 800 parts by volume of ether in 3 portions. The combined ether extracts are washed with water, sodium bicarbonate solution and water, dried and evaporated. The residue is taken up in ether, concentrated to a small volume and diluted with hexane until the solution becomes cloudy. The mixture is then left at 0° C. for several hours whereupon the 3β,20-diacetoxy-7-oxo-9,11-oxido-allo-pregnane can be separated by filtration. The pure product shows no absorption maximum in the ultraviolet absorption spectrum.

In an analogous way $\Delta^{7,8:9,11}$-3β,17β-diacetoxy-androstadiene is transformed into 3β,17β-diacetoxy-7-oxo-9,11-oxido-androstane.

Example 3

0.7 part by volume of methyl $\Delta^{7,8;9,11}$-3α-acetoxy-choladienate is dissolved in 120 parts by volume of glacial acetic acid and diluted with 20 parts by volume of an aqueous solution of hydrogen peroxide, containing 0.012 part by weight of active oxygen per part by volume. The reaction mixture is left at room temperature for 5 days and then worked up exactly as described in Example 2. There is obtained a nearly colorless oil from which by crystallization from a mixture of acetone and hexane or ether and pentane methyl 3α-acetoxy-7-oxo-9,11-oxido-cholanate is isolated. In ethanolic solution no maximum is observed in the ultraviolet spectrum.

What is claimed is:

1. A method of converting a member selected from the group consisting of $\Delta^{7,8;9,11}$-3-lower alkylcarbonyloxy-ergostadienes, $\Delta^{7,8;9,11}$-3-lower alkylcarbonyloxy-stigmastadienes, $\Delta^{7,8;9,11}$-3-lower alkylcarbonyloxy-allo-pregnadienes, $\Delta^{7,8;9,11}$-3-lower alkylcarbonyloxy-androstadienes and $\Delta^{7,8;9,11}$-3-lower alkylcarbonyloxy-choladienes to the corresponding 3-lower alkylcarbonyloxy-oxo-9,11-oxido-compounds, which comprises subjecting the said member of the said group to the action of hydrogen peroxide.

2. A method of converting a lower alkyl $\Delta^{7,8;9,11}$-3-lower alkylcarbonyloxy-choladienate to the corresponding lower alkyl 3-lower alkylcarbonyloxy-7-oxo-9,11-oxido-cholanate, which comprises subjecting the lower alkyl $\Delta^{7,8;9,11}$-3-lower alkylcarbonyloxy-choladienate to the action of hydrogen peroxide.

3. A method of converting methyl $\Delta^{7,8;9,11}$-3α-acetoxy-choladienate to the corresponding methyl 3α-acetoxy-7-oxo-9,11-oxido-cholanate, which comprises subjecting the methyl $\Delta^{7,8;9,11}$-3α-acetoxy-choladienate to the action of hydrogen peroxide.

References Cited in the file of this patent

UNITED STATES PATENTS

| | | |
|---|---|---|
| 2,323,277 | Miescher | June 29, 1943 |
| 2,576,949 | Levin | Dec. 4, 1951 |

OTHER REFERENCES

Fieser et al.: Natural Products Related to Phenanthrene, 3rd Ed., page 425 (1949).